United States Patent
Mergl et al.

(10) Patent No.: US 11,241,988 B2
(45) Date of Patent: Feb. 8, 2022

(54) VEHICLE SEAT ELEMENT, INSERT ELEMENT, CUSHION, METHOD FOR PRODUCING A VEHICLE SEAT ELEMENT

(71) Applicant: Brose Fahrzeugteile GmbH & Co. Kommanditgesellschaft, Coburg, Coburg (DE)

(72) Inventors: Christian Mergl, Zeil/Main (DE); Wojciech Falinski, Coburg (DE); Marcel Schieber, Ebersdorf (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 298 days.

(21) Appl. No.: 16/332,560

(22) PCT Filed: Sep. 11, 2017

(86) PCT No.: PCT/EP2017/072720
§ 371 (c)(1),
(2) Date: Mar. 12, 2019

(87) PCT Pub. No.: WO2018/046720
PCT Pub. Date: Mar. 15, 2018

(65) Prior Publication Data
US 2019/0217763 A1 Jul. 18, 2019

(30) Foreign Application Priority Data
Sep. 12, 2016 (DE) .......................... 102016217354.5

(51) Int. Cl.
*B60N 2/00* (2006.01)
*A61H 23/00* (2006.01)
(Continued)

(52) U.S. Cl.
CPC ......... *B60N 2/976* (2018.02); *A61H 23/0263* (2013.01); *B60N 2/70* (2013.01);
(Continued)

(58) Field of Classification Search
CPC ........ A61H 23/0263; A61H 2201/0138; A61H 2201/0142; A61H 2201/0146;
(Continued)

(56) References Cited

U.S. PATENT DOCUMENTS 5,007,410 A * 4/1991 DeLaney ............. A47C 21/006
5/694
5,437,608 A * 8/1995 Cutler ...................... A61H 1/00
5/915

(Continued)

FOREIGN PATENT DOCUMENTS

| CN | 103948494 A | 7/2014 |
| CN | 104918519 A | 9/2015 |

(Continued)

*Primary Examiner* — Timothy A Stanis
(74) *Attorney, Agent, or Firm* — Brooks Kushman, P.C.

(57) ABSTRACT

A vehicle seat element, in particular seat pan, backrest or seat headrest, having a cushion facing a vehicle occupant, a covering and at least one vibration massage unit, arranged underneath the covering in a recess in the cushion and consists of an electric drive and a driven unbalanced mass, arranged at one end of the elongate vibration massage unit, characterised in that the vibration massage unit is supported in the recess only at points, in lines and/or in small areas and is spaced from the end of the vibration massage unit at which the unbalanced mass is arranged, and the substantial portion of the walls of the recess is spaced from the vibration massage unit. An insert element for a vehicle seat element of this type, a cushion for a vehicle seat element of this type, and a method for producing a vehicle seat element of this type.

20 Claims, 11 Drawing Sheets

(51) Int. Cl.
   *B60N 2/90*    (2018.01)
   *B60N 2/70*    (2006.01)
   *A61H 23/02*   (2006.01)

(52) U.S. Cl.
   CPC ............... *A61H 2201/0149* (2013.01); *A61H 2201/0169* (2013.01)

(58) Field of Classification Search
   CPC .... A61H 2201/0165; A61H 2201/0169; B60N 2/70; B60N 2/976
   See application file for complete search history.

(56) References Cited

U.S. PATENT DOCUMENTS

| | | | |
|---|---|---|---|
| 6,053,880 A * | 4/2000 | Sleichter, III | A47C 7/40 297/217.3 |
| 6,682,494 B1 | 1/2004 | Sleichter, III et al. | |
| 8,398,569 B1 | 3/2013 | Mortimer et al. | |
| 2004/0143201 A1 | 7/2004 | Moriyasu | |
| 2014/0008948 A1 | 1/2014 | Rockwell et al. | |
| 2015/0032037 A1 | 1/2015 | Nakano et al. | |
| 2016/0278539 A1 * | 9/2016 | Gersin | A47C 21/006 |

FOREIGN PATENT DOCUMENTS

| | | |
|---|---|---|
| DE | 3235373 A1 | 3/1984 |
| DE | 102008024995 A1 | 11/2009 |
| DE | 102009033041 A1 | 1/2011 |
| DE | 102011109736 A1 | 12/2012 |
| DE | 102014213299 A1 | 1/2016 |
| DE | 102015011461 A1 | 3/2016 |
| WO | 2016005431 A1 | 1/2016 |

* cited by examiner

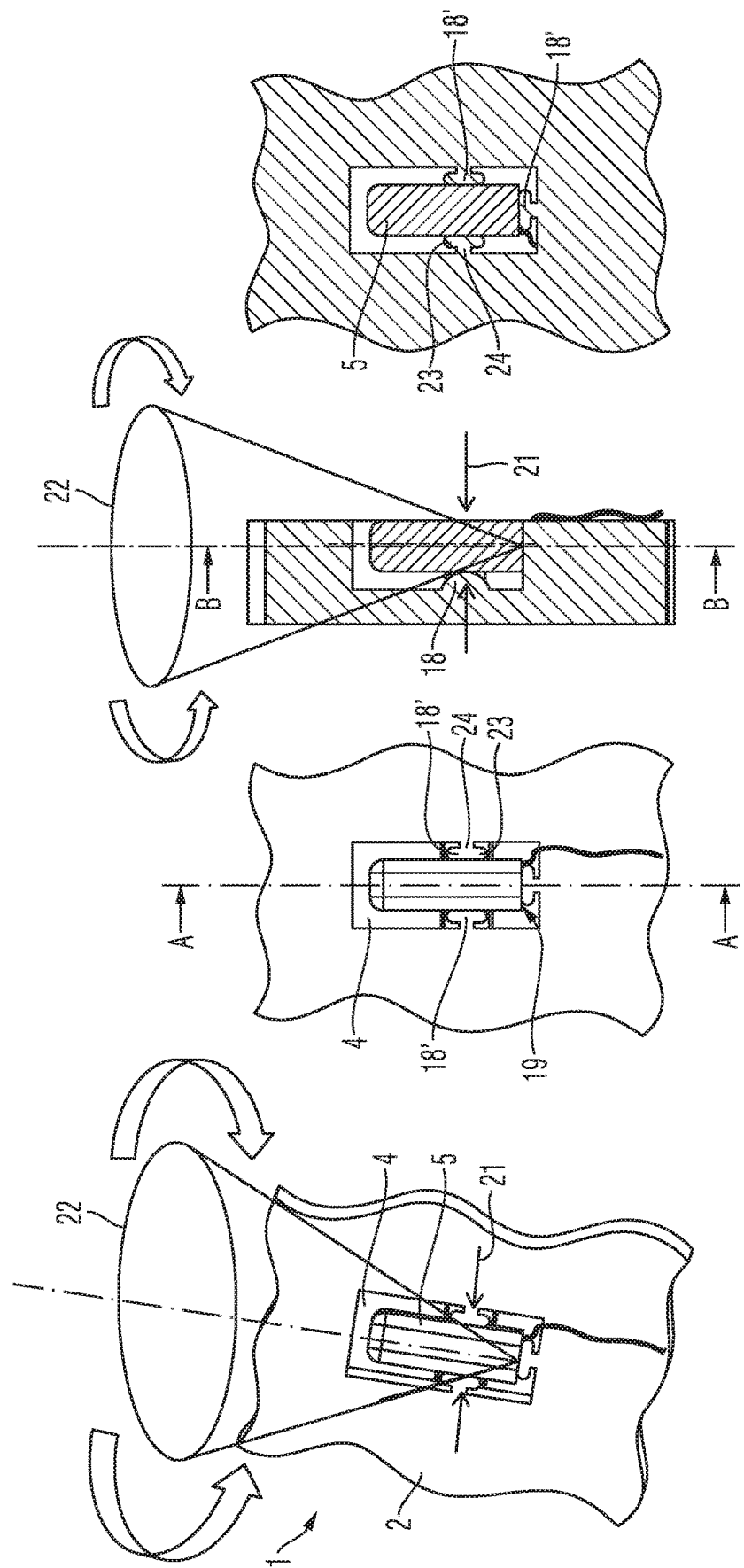

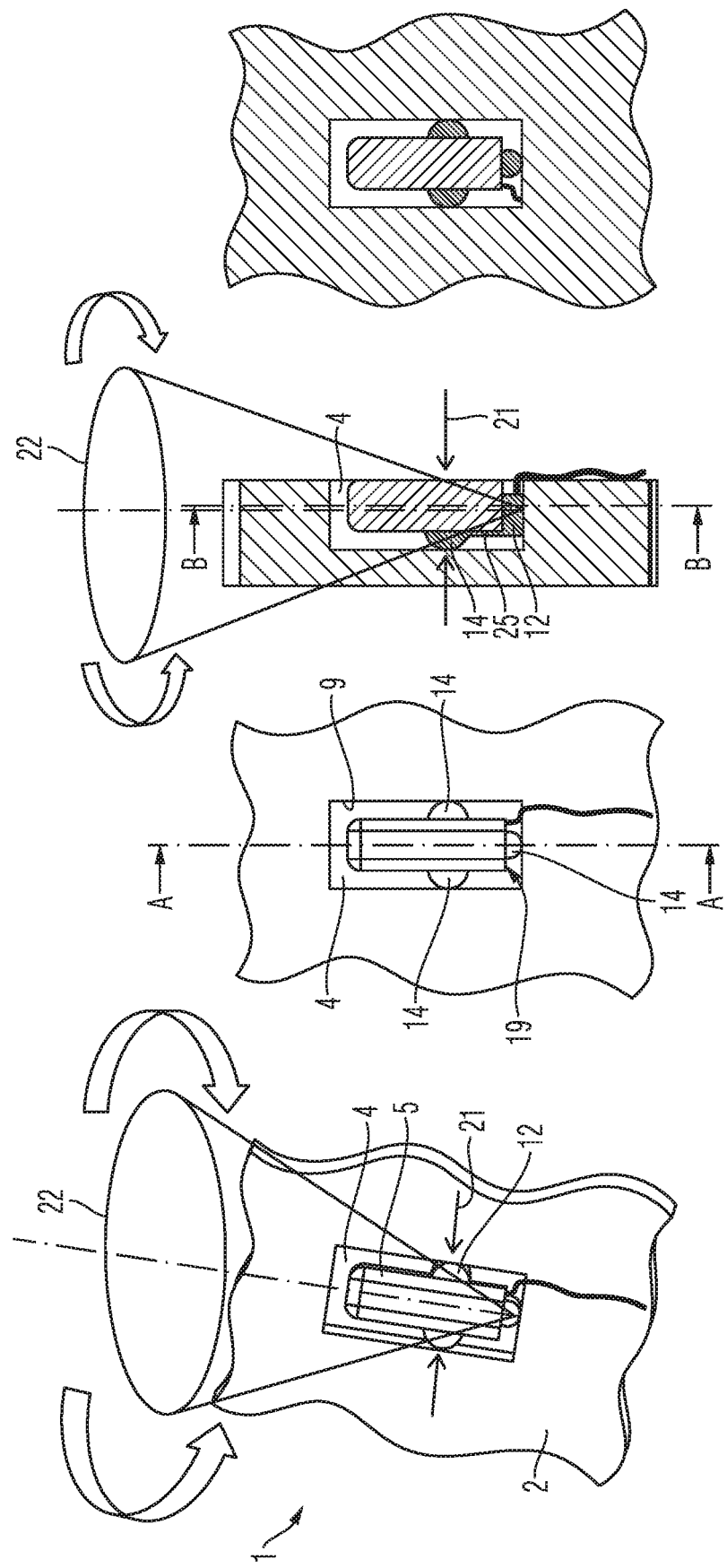

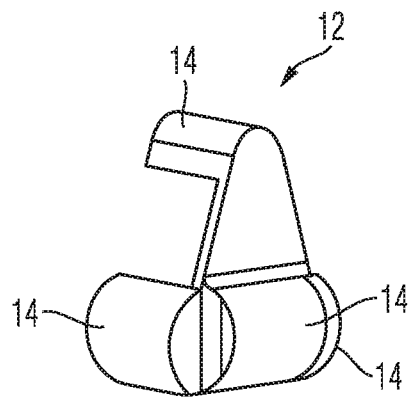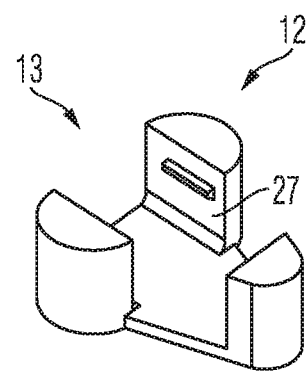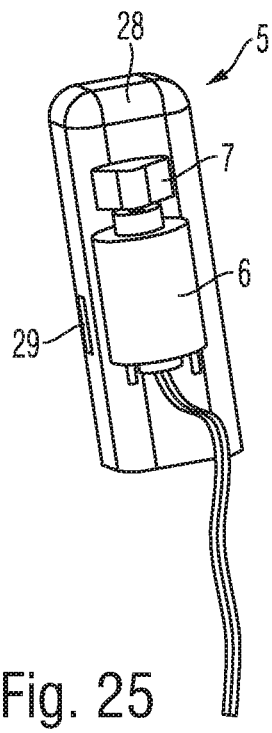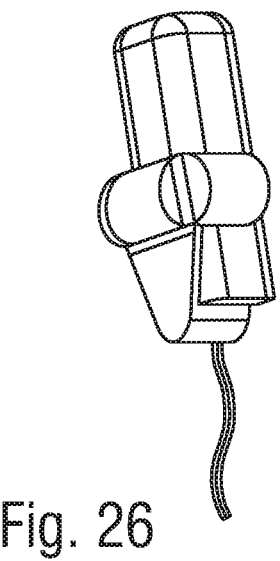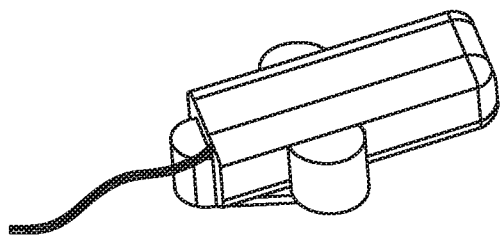
Fig. 23   Fig. 24
Fig. 25   Fig. 26
Fig. 27

VEHICLE SEAT ELEMENT, INSERT ELEMENT, CUSHION, METHOD FOR PRODUCING A VEHICLE SEAT ELEMENT

CROSS-REFERENCE TO RELATED APPLICATIONS

This application is the U.S. National Phase of PCT Application No. PCT/EP2017/072720 filed Sep. 11, 2017, which claims priority to German Patent Application No. 10 2016 217 354.5 filed Sep. 12, 2016, the disclosures of which are hereby incorporated in their entirety by reference herein.

FIELD OF INVENTION

The present invention relates to a vehicle seat element, in particular a seat pan, backrest or seat neck support, an insert element for accommodating a vibration massage unit in a recess of a cushion, in particular for such a vehicle seat element, a cushion for a vehicle seat element and a method for producing a vehicle seat element.

BACKGROUND

There are vehicle seats which comprise an integrated massage system. In order to incorporate the massage system, a carrier supporting several massage units is often provided, which is arranged on a seat or backrest cushion underneath the covering.

SUMMARY

In view of the above, it is an object of the present invention to provide an improved vehicle seat element.

According to the present invention, one or more objects are achieved by the present disclosure.

According to one embodiment, a vehicle seat element, in particular a seat pan, backrest or seat neck support, comprising a cushion facing a vehicle occupant, a covering and at least one vibration massage unit arranged in a recess of the cushion underneath the covering, consisting of an electric drive and a driven unbalanced mass which is arranged at one end of the elongate vibration massage unit, is provided. The vibration massage unit is supported in the recess only at a point, in lines and/or over a small area and spaced from the end of the vibration massage unit on which the unbalanced mass is arranged, and in that the substantial portion of walls of the recess is spaced from the vibration massage unit.

An insert element for accommodating a vibration massage unit in a recess of a cushion, in particular for a vehicle seat element according to the present invention, comprising: an accommodating portion for accommodating a vibration massage unit, and projections for supporting and spacing the accommodating portion from walls of a recess in a cushion, wherein the projections comprise at least in some portions a punctiform, linear and/or small-area cross-section.

A cushion for a vehicle seat element, in particular for a vehicle seat element according to the present invention, comprising: a recess for accommodating a vibration massage unit; projections provided on walls of the recess for supporting and spacing the vibration massage unit from the substantial portion of the walls, wherein the projections comprise at least in some portions a punctiform, linear and/or small-area cross-section.

According to another embodiment, a method of producing a vehicle seat element, in particular a vehicle seat element according to the one or more embodiments, is provided. The method may include the following steps: providing a vibration massage unit, comprising: an electric drive and a driven unbalanced mass, which is arranged at one end of the elongate vibration massage unit; a cushion, which has a recess for accommodating the vibration massage unit; and a covering; inserting the vibration massage unit into the recess; and supporting in a punctiform, linear and/or small-area manner spaced from the end of the vibration massage unit, at which end the unbalanced mass is arranged, and spaced from the vibration massage unit to the substantial portion of walls of the recess; covering the cushion with the covering, wherein the vibration massage unit is arranged underneath the covering.

It is a concept of the present disclosure that a cushion of a vehicle seat, in which a vibration massage unit is accommodated in a recess, absorbs and transmits vibrations. The absorption of vibrations causes, on the one hand, a damping of the massage effect, and, on the other hand, a transmission of the vibrations to the structure of the vehicle seat causes a generation of unwanted noise.

The concept on which the present disclosure is based is to decouple the vibration massage unit from the cushion as far as possible in terms of vibration by placing it in a distance i.e. spaced from the substantial portion of the walls of the recess in the cushion, and by supporting it only very locally in the recess with a minimal cross-sectional area, i.e. only at a point (punctiform), in lines (linear) and/or at a small area. The end of the vibration massage unit at which the unbalance mass is arranged is spaced from the support. The vibration massage unit may therefore oscillate almost freely within the recess, thereby avoiding vibrations to be damped by and transmitted to the cushion.

On the one hand, this extends the service life of the drive of the vibration massage unit, as the load on the drive is reduced when vibrations are not damped.

On the other hand, the acoustics upon operation is greatly improved, since much less or hardly any critical vibrations are transmitted to the cushion, which would otherwise cause unwanted resonance frequencies or disturbing noises.

In addition, the intensity of the massage is increased with less damping. This reinforcing effect is additionally enhanced by an arrangement of the vibration massage unit underneath the cover, in particular directly underneath the cover without a cushion sandwiched in between, and/or only with a support fleece sandwiched in between.

Furthermore, the sitting comfort is also improved by spacing the of the recess from the vibration massage unit, as the vibration massage unit, when not being in operation, may more easily give way upon a seating pressure acting on the covering.

The vibration massage unit consists of an electric drive and a driven unbalance mass, which, however, does not exclude the presence of other components, in particular housing components, electronic components, or the like. Rather, the electric drive and the driven unbalance mass are substantial components of the vibration massage unit, but they are not limited thereto.

Upon operation of the unbalance mass, the vibration massage unit is caused to swing or wobble, applying a massage effect to an occupant through the covering.

In particular, the recess is configured to be a pocket in the cushioning, and therefore comprises a bottom accordingly. However, a continuous recess is also conceivable.

A wall of the recess may thus be configured as a longitudinal or transverse wall or a bottom of the recess.

The support elements of the vibration massage unit may be configured in different ways and at different places, however, the support elements may not provide a uniform support in the cushioning, but a support provided only at a point, in lines and/or in small areas. For example, there may be provided local support elements of the cushioning, an insert element, a housing of the vibration massage unit, or the like.

In particular, in one embodiment, the support elements are projections of an insert element according to the present invention. In this case, a vibration massage unit may be mounted first in the mounting section of the insert element, and then the insert is inserted into the recess together with the vibration massage unit.

Furthermore, according to one embodiment of the present invention, the support elements may also be projections extending from the walls of the recess within the cushion.

The projections may have a round shape. Particularly in the case of a spherical shape, the projections may provide support in one point on their surface. In the case of a two-dimensional round shape of the projections, they may in particular provide support in or along lines (linear support). Also, the round-shaped projections may have a portion configured as a small area with a local flattening, with the small area providing support.

In addition, it may also be a projection having a small cross-sectional area in sections, for example in the form of a local taper of the projection, to provide a small-area support. In this case, a section with a small cross-sectional area may be configured to be flexible.

In addition, different support elements or projections may be provided at different locations, for example small areas on a side wall and linear areas on a bottom wall. Other combinations of support elements which are configured at a point, in lines and/or as a small area are also possible.

The support elements may also be formed partly by the cushion and/or partly by an insert element or housing of the vibration massage unit or other elements.

The distance of the substantial portion of the walls from the vibration massage unit is uniform, in particular on all walls of the recess.

A substantial portion of the walls is at least a predominant part of the walls, such as a greatly predominant part, for example greater than 80%, or greater than 90%.

Furthermore, the substantial portion may also include all of the walls, in particular in the case of a support element and spacing formed by an insert element.

The mounting and spacing may be provided without external fixing means, or it may be that the mounting and spacing is provided completely within the recess.

Advantageous embodiments result from the the description in combination with the Figures.

According to one embodiment, the elongate projection of the vibration massage unit faces in the direction of a shaft of the electric drive. Furthermore, the unbalance mass may be driven rotatably around the shaft, wherein the punctiform, linear and/or small-area support element in the recess is provided around the circumference of the vibration massage unit, at right angles to the shaft. Accordingly, forces that are acting in a radial direction are supported. The right-angled support is not necessarily accurately aligned at right angles to the shaft when not in operation; however, the support is arranged in such a way that it is adapted to be substantially normal to the shape of the cushion surface and/or the cover, taking producing tolerances into account. In addition, upon operation the vibration massage unit carries out a vibrating movement, for example a wobbling movement. In other words, the alignment always varies to some extent upon operation.

In particular, a support by which the vibration massage unit or the wall of the recess is supported may have a predetermined range of movement, thus adapting to variations from being accurately normal or to vibrations during operation.

According to one embodiment, the vibration massage unit is supported at a point, in lines and/or over a small area at the height of its center of mass in the recess. In this way, the center of mass may advantageously form a center of vibration of the vibration massage unit. Alternatively or additionally, the vibration massage unit may be supported at a point, in lines and/or over a small area at the height of its center in the recess. Deviations from an accurate alignment at the center or at the height of the center of mass are possible. For example, the arrangement may be provided at or near the center of mass or in a center area, for example in a third of the center area, of the vibration massage unit.

According to one embodiment, the punctiform, linear and/or small-area support elements of the vibration massage unit are arranged in the recess in a plane perpendicular to the shaft. In this way, a uniform vibration or symmetrical movement path of the vibration massage unit is provided during operation. In an alternative embodiment, the punctiform, linear and/or small-area support elements of the vibration massage unit in the recess are offset to each other with each support element being arranged in a different plane. In this way, the vibration characteristics may be tuned in a defined manner such that, for example, a desired vibration characteristic or a desired path of movement, which may also be asymmetrical, may be set.

According to one embodiment, the shaft is aligned approximately parallel to the covering. In the case of a vertical alignment of the shaft, the unbalance mass is arranged at the top thereof. Furthermore, a further punctiform, linear or small area support element of the vibration massage unit is provided in the area of its lower end, such as in a projected extension of the shaft. In this way, the vibration massage unit is secured against an unintentional slipping during operation. Furthermore, this also facilitates manipulation of the oscillation movement in a predetermined manner, for example a wobbling movement having a center located below the center of mass of the vibration massage unit or close to the lower end.

According to one embodiment, the punctiform, linear and/or small-area support elements of the vibration massage unit in the recess of the cushion form a flexible support. This support is provided in such a way that the vibration massage unit in the recess may move in a predetermined manner during operation. It may be that the predetermined movement is provided in such a way that the vibration massage unit is supported to vibrate freely or almost freely. In particular, in contrast to a case where the support is provided across the entire surface, it is advantageously avoided that the entire recess has to move together with the vibration massage unit.

According to one embodiment, the punctiform, linear and/or small-area support elements of the vibration massage unit are formed integrally with the cushioning. In this way, it is avoided that other fastening means have to be used to retain the vibration massage unit in the cushioning. The cushioning thus forms a wobble support for the vibration massage unit. In this way, a number of components which are required is advantageously reduced. In fact, the vibration massage unit may be pressed directly into the recess without the use of further fastening means. Thus, an improvement with respect to manufacturing as well as assembly is achieved.

According to one embodiment, the punctiform, linear and/or small-area support elements of the vibration massage unit are formed with an insert element which is inserted into the recess of the cushion. It may be that a vibration massage unit may be inserted into a cushion in a modular manner, and the shape of a vibration massage unit may be different from the shape of the recess. The insert element provides a wobble support for the vibration massage unit inside the recess. Thus, a range of application for different seat arrangements, e.g. different vehicle classes or different manufacturers, is advantageously increased, avoiding extensive adaptation requirements or customizing of the cushioning.

According to one embodiment of an insert element, the projections have a flexible portion. In this way, the flexibility provided for the vibration of the vibration massage unit is advantageously provided in the insert element itself. In this way, the vibration characteristics are independent of the properties of the cushioning, thus facilitating a particularly wide range of applications, in particular independent of various shapes, densities, dampings etc. of the cushion. In addition, by choosing the flexible range appropriately it is possible to achieve an optimum adjustment of the support in a simple manner with respect to the desired vibration characteristic.

According to one embodiment, the projections have a mounting portion facing away from the accommodating portion, which has fixing means for fixing the insert in an accurate position in a wall of a recess of a cushion. In this way the vibration massage unit is effectively secured against unwanted slipping.

According to one embodiment, the fastening means are configured as claws to engage in cushioning material, in particular cushioning foam. Advantageously, the mounting portion may be inserted directly into the recess without using further fixing means, such as the use of adhesives or the like, which would be necessary for fixing in the correct position. Assembly is therefore simple, quick and, in particular, without the use of adhesives.

According to one embodiment, the cushion is configured as a foam cushion, wherein the projections are configured as foam projections or foam webs formed in one piece with the foam cushion. The foam thus forms a wobble support for the vibration massage unit. The projections may also be formed directly during the cushioning production process. In this way, the number of producing steps is reduced.

The above embodiments may be combined with each other in any sensible. In particular, some features of the insert element or cushion may also be used with the vehicle seat element. Furthermore, some features of the vehicle seat element may also be used with the method of producing the vehicle seat element.

Further possible embodiments of the present invention may also include combinations, which are not explicitly mentioned, of features of the present invention described before or in the following with regard to the exemplary embodiments. In particular, the skilled person might add individual aspects as improvements or additions to the respective basic embodiment of the present invention.

BRIEF DESCRIPTION OF THE DRAWINGS

The present invention will be explained in more detail below in combination with exemplary embodiments shown in the Figures, wherein:

FIG. 6 shows a schematic perspective view of a section of a vehicle seat element according to a further embodiment;

FIG. 7 shows a top view of the vehicle seat element according to FIG. 6;

FIG. 8 shows a cross-section of the vehicle seat element along the line A-A according to FIG. 7;

FIG. 9 shows a further cross-section of the vehicle seat element along the line B-B in FIG. 8;

FIG. 14 shows a schematic perspective view of a section of a vehicle seat element according to a further embodiment;

FIG. 15 shows a top view of the vehicle seat element according to FIG. 14;

FIG. 16 shows a cross-section of the vehicle seat element along the line A-A according to FIG. 15;

FIG. 17 shows a further cross-section of the vehicle seat element along the line B-B in FIG. 16;

FIG. 23 shows a perspective bottom view of the insert element according to FIG. 18;

FIG. 24 shows a perspective top view of the insert element according to FIG. 18;

FIG. 25 shows a representation of a vibration massage unit;

FIG. 26 shows a perspective assembly diagram of a vibration massage unit with the insert element according to FIGS. 18 to 24 from the bottom;

FIG. 27 shows a perspective assembly diagram of the vibration massage unit with the insert element from the top;

The enclosed Figures are intended to provide a further understanding of the embodiments in which the invention was carried out. They illustrate exemplary embodiments and serve, in connection with the description, to help explain the principles and concepts of the present invention. Other embodiments and many of the advantages mentioned result from the Figures. The elements of the Figures are not necessarily drawn to scale.

In the Figures, like elements, features and components having the same function and effect are indicated by the same reference signs, unless otherwise specified.

DESCRIPTION OF EMBODIMENTS

An exemplary massage system is disclosed in document DE 10 2009 033 041 A1.

Such a carrier prevents the massage units from rotating or slipping during a massage cycle. However, it is a disadvantage of such a supporting carrier that it impairs the sitting comfort. In particular, elements of the massage system which are arranged underneath the covering may be sensed by an occupant.

In addition, vibrations of the vibration massage units are often transmitted to the cushioning and thus to the seat structure, which causes unwanted noise.

Figure 1:
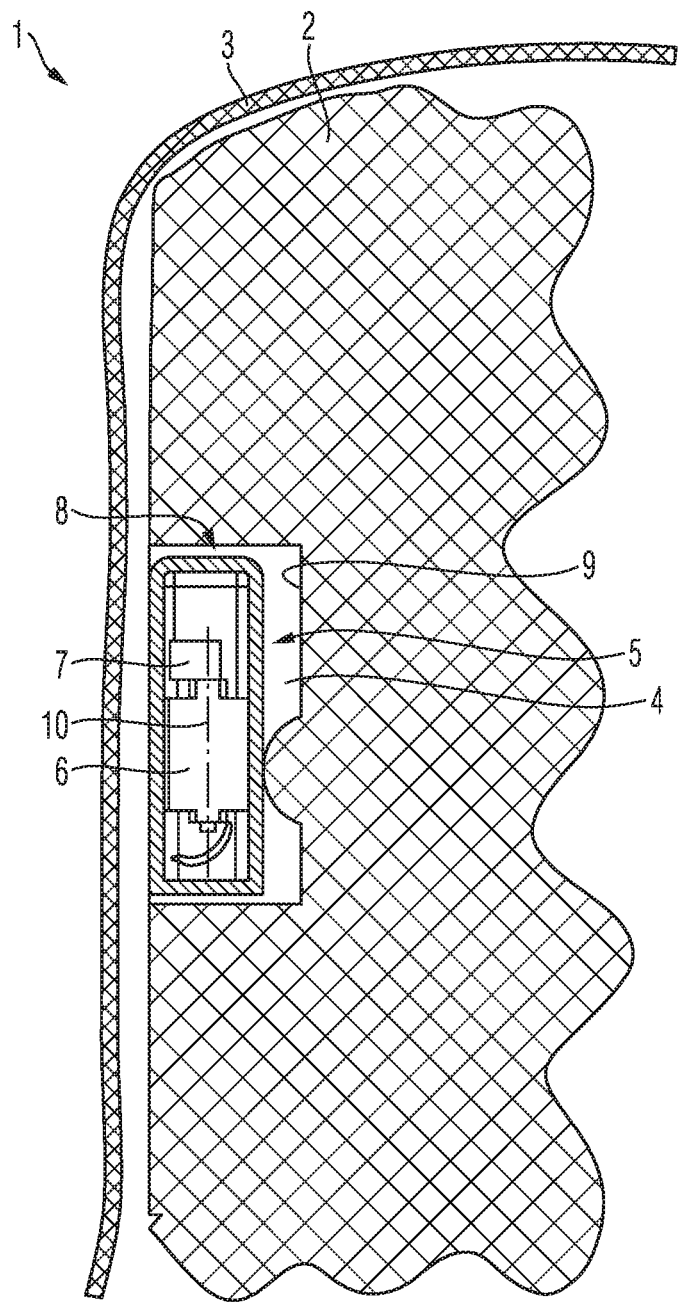
FIG. 1 shows a schematic cross-section of a vehicle seat element.

FIG. 1 shows a schematic cross-section of a vehicle seat element 1.

The vehicle seat element 1 comprises a cushion 2, which is provided with a covering 3. Furthermore, a recess 4 is provided in the cushion 2, in which a vibration massage unit 5 is arranged underneath the covering 3.

The vibration massage unit 5 comprises an electric drive 6 and an unbalance mass 7 driven by the electric drive 6.

The vibration massage unit 5 extends longitudinally in the direction of a shaft 10 of the electric drive 6, around which the unbalance mass 7 may also be driven.

The vibration massage unit 5 is supported only at a point in the recess 4, and is spaced from the end 8 of the vibration massage unit 5 at which the unbalance mass 7 is arranged. The support is provided at right angles to the shaft 10 so that it absorbs forces acting in the radial direction.

In this example, the support is formed by a projection, which is semi-circular in cross-section, of the cushion 2, which contacts a housing of the vibration massage unit 5 at a point, i.e. the support is punctiform. It would also be conceivable, however, to form the punctiform support with a corresponding projection of the housing of the vibration massage unit or with an insert element inserted in recess 4.

The semi-circular projection shown in the cross-section may be hemispherical in shape and provide punctiform support for the vibration massage unit on its surface.

However, it would also be conceivable to form the projection into a semi-cylindrical shape and thus provide a line-like, i.e. linear support.

In addition to the projection shown, further projections providing a punctiform or linear support may be provided to support the vibration massage unit 5 in the recess 4.

For example, the further support elements are provided on other walls 9 of the recess 4 at the same height, i.e. normal to the shaft 10 in a common plane. It is also conceivable to arrange the further support elements to be offset with the support elements being arranged in several of such levels, respectively.

The support is arranged in a central area of the vibration massage unit and is provided in such a way that the substantial portion of the walls 9 of the recess 4 is spaced from the vibration massage unit 5. This allows the vibration massage unit 5 to vibrate freely within the recess 4, i.e. without being obstructed.

For example, the ends of the vibration massage unit 5 each describe an elliptical path. In this way a massage effect is exerted on the covering 3.

If the vehicle seat element 1 forms part of a vehicle seat, the cushioning 2 facing an occupant of the vehicle seat with the side comprising the covering 3. The massage effect caused by the vibration massage unit is thus, during operation, transferred within a vehicle seat to an occupant who is in contact with the covering.

Figure 2:
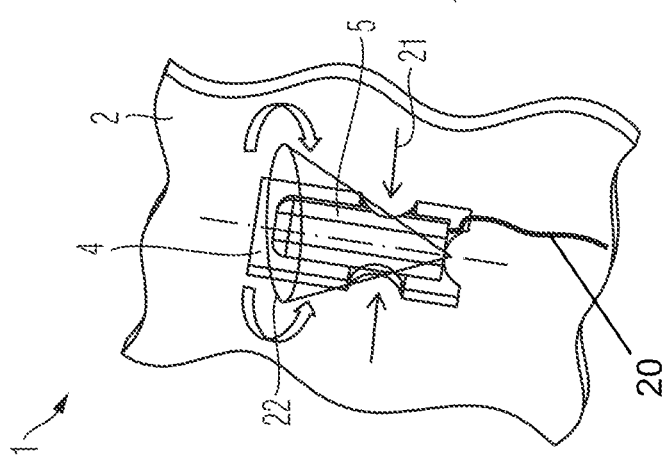
FIG. 2 shows a schematic perspective view of a section of a vehicle seat element.

FIG. 2 shows a schematic perspective view of a section of a vehicle seat element 1.

The vehicle seat element 1 shown here does not have the covering 3, so that the recess 4 of the cushion 2, in which the vibration massage unit 5 is arranged, is visible.

A connection cable 20 is provided for supplying power to the drive 6 of the vibration massage unit 5.

In this example, a movement path 22 of the vibration massage unit 5 is indicated schematically. The movement path 22 indicates an elliptical wobbling movement.

A center of the wobbling movement is arranged on an axis which coincides with the position of the shaft 10 of the drive 6 when not in operation. In the longitudinal direction, the center may be located at different points depending on the embodiment, i.e. in particular depending on the dimensioning of the unbalance mass, the weight, and center of mass of the vibration massage unit, and the material properties of the cushion material. In a possible embodiment, the center is at the height of the support of the vibration massage unit 5. This may be the case in particular if the center of mass of the vibration massage unit 5 is approximately at the height of the support. In a further embodiment, however, the center may also be located in a lower part or outside the vibration massage unit.

The direction of rotation of the movement depends on the direction of rotation of the unbalance mass 7, wherein both directions of rotation are possible. Depending on the direction of rotation of the unbalance mass 7, a left or right rotation along the path of movement is possible, as is indicated by the arrows pointing in opposite directions.

Figure 3:
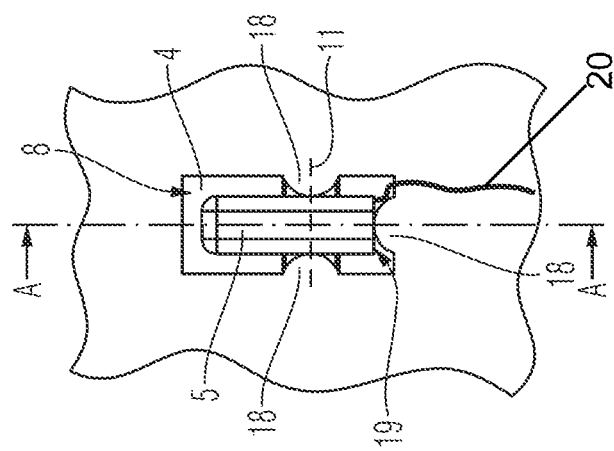
FIG. 3 shows a top view of the vehicle seat element according to FIG. 2.

FIG. 3 shows a top view of the vehicle seat element 1 according to FIG. 2.

In this view, the recess 4 comprises a semi-cylindrical projection 18 at the same height on either longitudinal side. The projections 18, which in this example form the support of the vibration massage unit, thus are arranged in a common plane 11 along the circumference, which common plane 11 is perpendicular to the shaft 10 when not in operation.

In further embodiments, the support through the individual projections may also be configured to be offset when arranged in several levels or planes. In this way, the movement path 22 may be manipulated in a predetermined manner. For example, a predetermined compression or expansion of the movement path 22 may also be achieved in this way.

The arrangement/alignment of the vibration massage unit 5 is intended to be upright or vertical. While the upper end 8 of the vibration massage unit 5 is free, it is supported at a lower end 19 by a further projection 18, which prevents the vibration massage unit 5 from slipping during operation.

Figure 4:
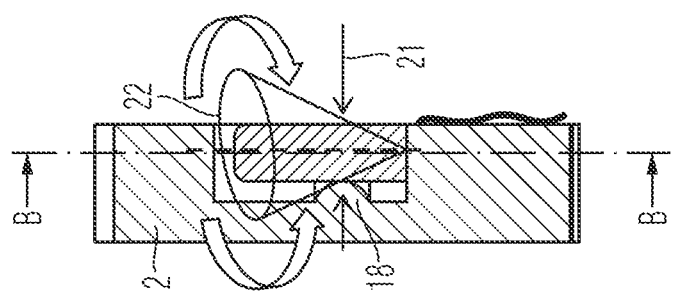
FIG. 4 shows a cross-section of the vehicle seat element along the line A-A according to FIG. 3.

FIG. 4 shows a cross-section of the vehicle seat element according to FIG. 3. The corresponding cutting line A-A is indicated in FIG. 3.

In this example, for clarity reasons the vibration massage unit 5 is indicated as a block, with the vibration massage unit 5 being configured as described with respect to FIG. 1 comprising the electric drive 6 and an unbalance mass 7.

As shown in FIG. 4, a projection 18 is also provided at the bottom of recess 4. This projection is located at the same height as the projections 18 provided on the longitudinal sides of the recess 4. Accordingly, a linear support of the vibration massage unit 5 is provided at the same height in a circumferential manner, the direction 21 of the support indicated by the arrows.

In this example, a flexible support is thus provided for the vibration massage unit 5, so that it may swing/vibrate freely within the recess during operation, as is indicated by the movement path 22.

The vibration is transmitted directly to the covering 3 (not shown), underneath which the vibration massage unit 5 is located.

Figure 5:
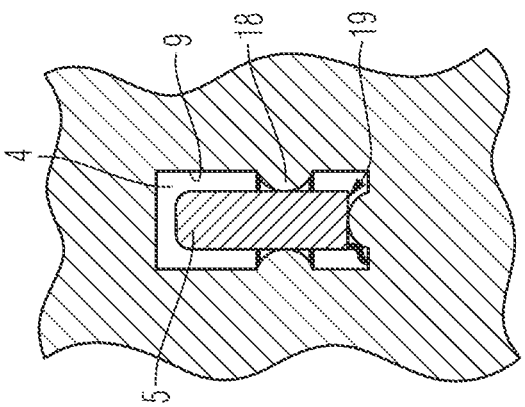
FIG. 5 shows a further cross-section of the vehicle seat element along the line B-B in FIG. 4.

FIG. 5 shows a further cross-section of the vehicle seat element 1 along the cutting line B-B in FIG. 4.

In this example, the longitudinal projections 18 and the projection 18 are visible at the lower end 19 in a cross-cross-section.

The cushion 2 is configured in particular as a foam cushion, wherein the projections 18 are provided as foam projections formed in one piece with the foam cushion.

The projections 18 extend from the walls 9 of the recess. At their surface, a tangential cross-section of the projections is linear to the surface. Thus they provide on their surface a linear support for the vibration massage unit 5.

Furthermore, the projections are spaced from the upper end 8 of the vibration massage unit 5, at which the unbalance mass 7 is arranged. The upper end 8 is thus free.

Nevertheless, the vibration massage unit 5 is uniformly spaced from the substantial portion of the walls 9 by the projections 18 across the entire length of the vibration massage unit 5.

FIG. 6 shows a schematic perspective view of a section of a vehicle seat element 1 according to another embodiment.

In contrast to the embodiment shown FIGS. 2 to 5, in this example the longitudinal projections 18' are configured as foam webs. In the same way, the projection 18' arranged from the lower end 19 is also configured as a foam web.

FIG. 7 shows a top view of the vehicle seat element 1 according to FIG. 6. FIG. 8 shows a cross-section along the cutting line A-A in FIG. 7, and FIG. 9 shows another cross-section along the cutting line B-B in FIG. 8.

In the example shown in FIG. 9, the foam webs 18' are configured to be integral with cushion 2. However, they have a narrow base area 24 and a wide top area 23. At the wide top area 23 the projections are in contact with the vibration massage unit 5. The base area 24, on the other hand, has a small cross-section, and thus provides a high degree of flexibility.

The projection 18 arranged at the bottom of the recess 4 is the same as described with respect to FIGS. 2 to 5, i.e. comprising a semi-cylindrical shape.

Due to the flexibility of the base area 24 of the projections 18', the vibration massage unit 5 may also swing freely within the recess 4, as indicated by the movement path 22 in FIGS. 6 and 8.

Figure 10:
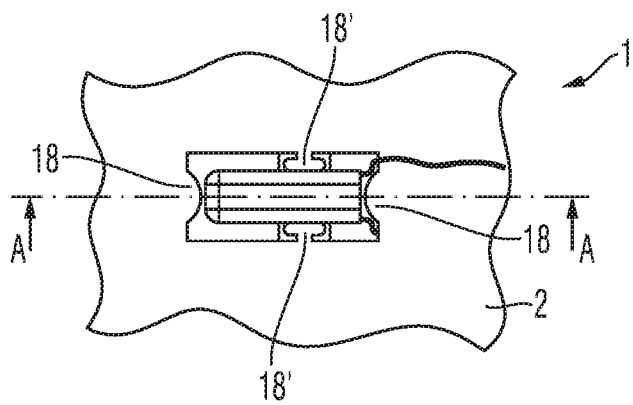
FIG. 10 shows top view of a vehicle seat element with horizontal vibration massage unit.

FIG. 10 shows a top view of a vehicle seat element comprising a horizontal vibration massage unit 5.

The horizontal alignment differs from the vertical alignments according to FIGS. 2 to 9 in that a projection 18 is arranged at both ends 8, 19 of the vibration massage unit 5, which prevents the vibration massage unit from slipping. These projections 18 are semi-cylindrical, as shown in particular in FIGS. 10 and 12.

Figure 11:
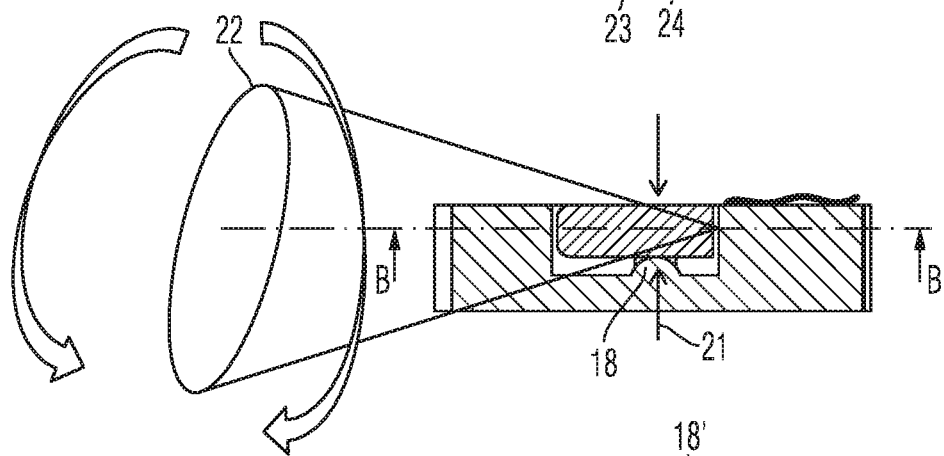
FIG. 11 shows a cross-section of the vehicle seat element along the line A-A according to FIG. 10.

FIG. 11 shows a cross-section of the vehicle seat element 1 according to FIG. 10 along the cutting line A-A.

In this example, projection 18 provided at the bottom of recess 4 is semi-cylindrical, similar to the example shown in FIGS. 6 to 9.

Furthermore, in this example a movement path 22 of the free oscillation in the form of a wobbling movement of the vibration massage unit 5 during operation is indicated.

Figure 12:
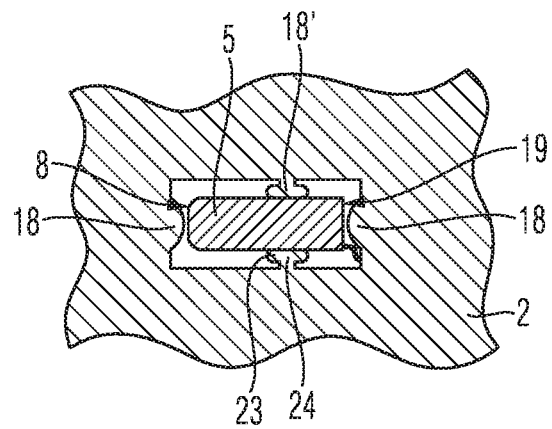
FIG. 12 shows a further cross-section of the vehicle seat element along the line B-B in FIG. 11.
Figure 13:
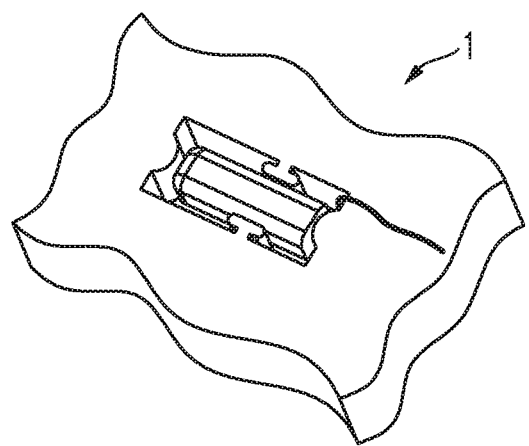
FIG. 13 shows a schematic perspective view of the vehicle seat element according to FIG. 10.

FIG. 12 shows another cross-section along the cutting line B-B in FIG. 11, and FIG. 13 shows a schematic perspective view of the vehicle seat element according to FIG. 10.

As may be seen from the above, in this example the longitudinal projections 18' are formed as foam webs with top area 23 and base area 24, in the manner described in relation to FIGS. 6 to 9. Thus, in this example the vibration massage unit 5 is supported by a small area laterally, and is supported in lines at the bottom of the recess 4. At the upper and lower end 8, 19 only a securing means is provided to avoid slipping.

FIG. 14 shows a schematic perspective view of a section of a vehicle seat element 1 according to a further embodiment.

In contrast to the embodiments described above, the vibration massage unit 5 is supported by an insert element 12.

In this example, the walls 9 of the recess 4 are configured to be flat.

The insert element 12 has semi-cylindrical projections 14 for supporting and spacing the vibration massage unit 5.

As a further difference in this example, a linear cross-section on the surface of the projections 14 is not adjacent to the vibration massage unit, but is provided on a section of the insert element 12 adjacent to the walls 9. The movement of the vibration massage unit 5 is thus provided by a linear support of the insert element 12 in the area of the walls 9.

In this example, as shown by the movement path 22, the type of operation is substantially the same as that of the integral support element formed with cushion 2, i.e. an obstacle-free wobbling movement of the vibration massage unit 5.

FIG. 15 shows a plan view of the vehicle seat element 1 according to FIG. 14.

One can see that a corresponding projection 14 of the insert element 12 is provided both on the longitudinal walls 9 and on a lower end 19 of the vibration massage unit.

FIG. 16 shows a cross-section of the vehicle seat element along the cutting line A-A according to FIG. 15.

This view also shows a projection 14 of the insert element 12 directed towards the bottom of recess 4.

In addition, insert element 12 comprises all projections 14 connected integrally. A web 25 connecting projection 14 at the lower end 19 with projection 14 oriented towards the bottom of recess 4 is shown in this example. In the same way, there is also a cross-connection between the longitudinal projections 14 by a web 25.

FIG. 17 shows a further cross-section of the vehicle seat element along the cutting line B-B in FIG. 16.

In this view the projections 14 are visible in cross-section with their material being different to the material of cushion 2 in comparison. Furthermore, it may be seen that the projection 14 at the lower end 19 of the vibration massage unit 5 is formed with a smaller radius compared to the lateral projections 14.

Figure 18:
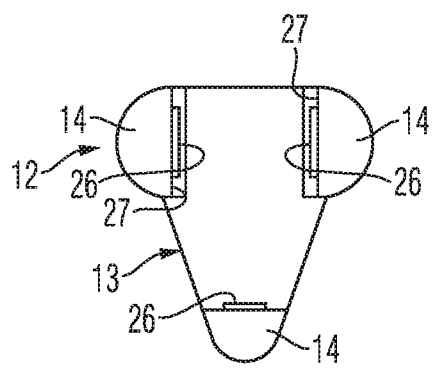
FIG. 18 shows top view of an insert element.

FIG. 18 shows a top view of an insert element 12.

The insert element 12 has a total of four projections 14, three of which are shown in top view.

An accommodating portion 13 is arranged between the projections 14, which portion 13 is configured and provided for accommodating a vibration massage unit 5.

Figure 19:
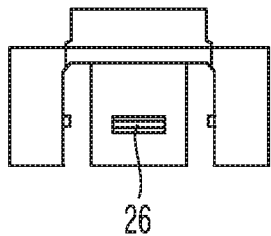
FIG. 19 shows a rear view of the insert element according to FIG. 18.

FIG. 19 shows a rear view of the insert element 12 according to FIG. 18.

Figure 20:
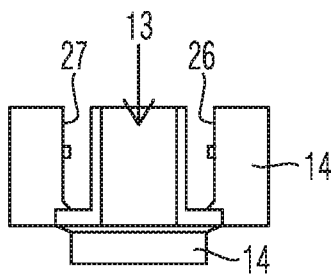
FIG. 20 shows a front view of the insert element according to FIG. 18.
Figure 21:
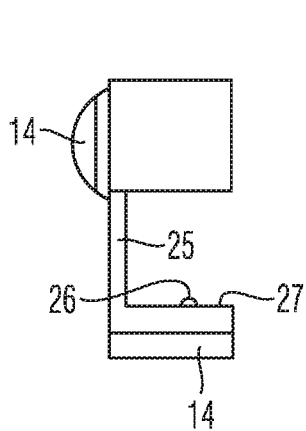
FIG. 21 shows a side view of the insert element according to FIG. 18.
Figure 22:
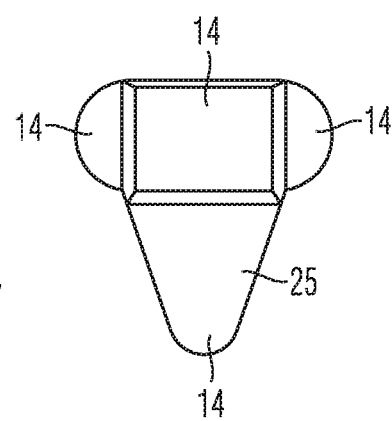
FIG. 22 shows a bottom view of the insert element according to FIG. 18.

FIG. 20 shows a front view, FIG. 21 shows a side view, and FIG. 22 shows a bottom view of the insert element according to FIG. 18.

The projections 14 comprise a height which corresponds approximately to the depth of the recess 4. They are connected to each other by the web 25, which extends along a side facing the bottom of the recess 4 in the mounted state, on which side the projection 14 facing the bottom is also provided.

For the accommodating the vibration massage unit 5, locking means 26 are provided on inner surfaces of the projections 14 facing the accommodating portion 13, which may be locked into place with a counter locking means on the housing 28 of the vibration massage unit 5. In this example, the locking means 26 are configured in the form of locking or latching projections.

FIG. 23 shows a perspective bottom view of the insert element according to FIG. 18, while FIG. 24 shows a perspective top view.

In particular, in FIG. 24 the accommodating portion 13, defined by the inner surfaces 27, is clearly visible. FIG. 23 shows the shape of the projections 14, which round off the insert element 12 to four sides.

FIG. 25 shows a representation of a vibration massage unit 5 on its own.

As described with respect to FIG. 1, the vibration massage unit 5 comprises an electric drive 6 and an unbalance mass 7.

These components are accommodated in an elongate housing 28, which extends parallel to the direction of the shaft 10 of the drive 6, and into which the connecting cable 20 extends for supplying power to the drive 6.

Furthermore, the housing 28 comprises counter locking or latching means 29, which, in this example, are formed in the form of latching recesses.

FIG. 26 shows a perspective assembly diagram of a vibration massage unit 5 with the insert element 12 in a bottom view according to FIGS. 18 to 24. FIG. 27 shows this assembly diagram in a top view.

In the assembled state shown here, the vibration massage unit 5 is inserted into the accommodating portion 13 of the insert element 12. The outer surfaces of the housing 28 are in contact with the inner surfaces 27 of the insert element 12, wherein the latching means 26 are latched to the counter latching means 29. In this way, a positive connection is created between the vibration massage unit 5 and the insert element 12.

Figure 28:
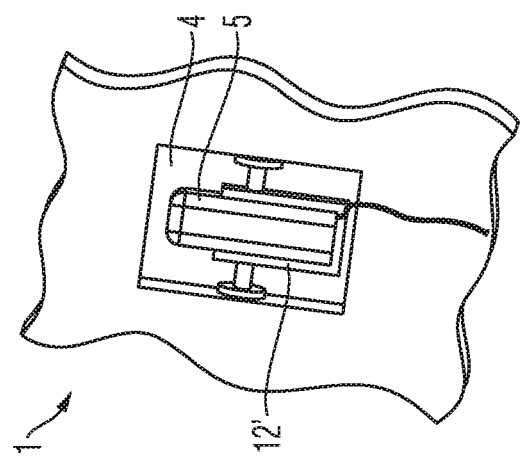
FIG. 28 shows a schematic perspective view of a section of a vehicle seat element according to a further embodiment.

FIG. 28 shows a schematic perspective view of a section of a vehicle seat element 1 according to a further embodiment.

This embodiment also shows an insert element 12', which differs fundamentally from the insert element 12 according to FIGS. 14 to 27 by the configuration of the projections 14' thereof.

Figure 29:
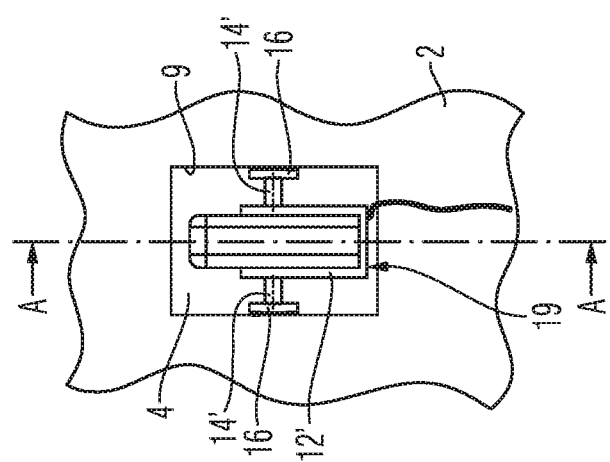
FIG. 29 shows a top view of the vehicle seat element according to FIG. 28.

FIG. 29 shows a plan view of the vehicle seat element 1 according to FIG. 28.

The insert element 12' only comprises two lateral projections 14'. No projection is provided at the lower end 19 of the vibration massage unit.

The projections 14' comprise a mounting portion 16 by which they are fixed to the longitudinal walls of the recess 4.

Figure 30:
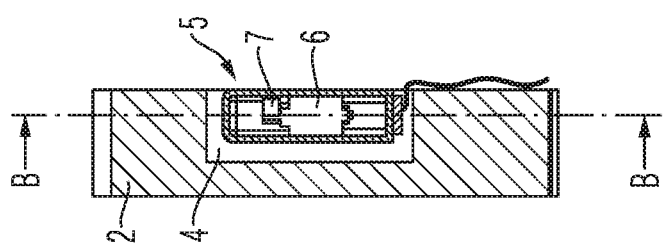
FIG. 30 shows a cross-section of the vehicle seat element along the line A-A according to FIG. 29.

FIG. 30 shows a cross-section of the vehicle seat element along the cutting line A-A according to FIG. 29.

In this view one can clearly see that there is also no projection facing the bottom of recess 4.

Accordingly, the insert 12' is only supported by the projections 14' and their mounting sections 16 in cushion 2.

Figure 31:
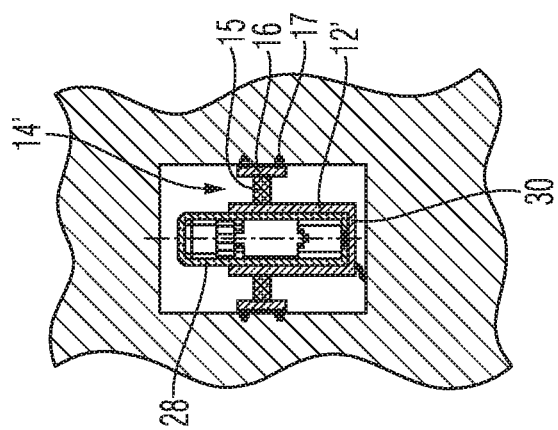
FIG. 31 shows a further cross-section of the vehicle seat element along the line B-B in FIG. 30.

FIG. 31 shows a further cross-section of the vehicle seat element along the cutting line B-B in FIG. 30.

This view clearly shows constructive differences of the projections 14' of the insert element 12'.

In the area of the projections 14', a flexible portion 15 is provided between the mounting section 16 and a web 30 connecting the projections 14', the web 30 partially enclosing the housing 28 of the vibration massage unit 5. This flexible portion 15, which has a small cross-section, may provide the desired movement of the vibration massage unit 5 during operation is ensured. For example, this could be an elastomeric material.

Furthermore, sufficient attachment of the insert 12' may be provided by the mounting sections 16, which have fastening means 17 in the form of claws engaging in the cushioning foam of the cushion 2.

Thus, both the upper end 8 of the vibration massage unit, on which the unbalance mass 7 is arranged, and the lower end 19 may vibrate freely. The projections 14' are provided at the height of the center of mass of the vibration massage unit 5.

Figure 32:
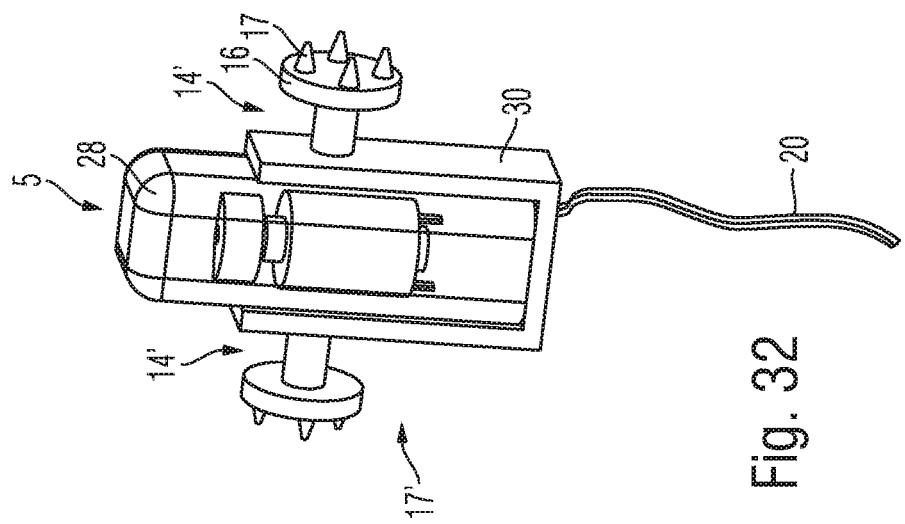
FIG. 32 shows a perspective assembly diagram of a vibration massage unit with an insert element according to FIGS. 28 to 31.

FIG. 32 shows a perspective assembly diagram of a vibration massage unit 5 with an insert element 12' according to FIGS. 28 to 31 without cushion 2.

In the perspective view the mounting section 16 of the projections 14' with the claw-like fastening means 17 are clearly visible.

Furthermore, it may be clearly seen that the web 30 connecting the projections 14' has a thickness which corresponds approximately to the thickness of the housing 28 of the vibration massage unit 5, and securely accommodates the vibration massage unit 5. For this purpose, locking means and counter locking means may be provided on the housing 28 and the web 30, similar to those described according to insert element 12 shown in FIGS. 18 to 27. Alternatively, the web 30 may also be connected to the housing 28 in a material-locked manner, or may be configured in one piece with the housing 28 of the vibration massage unit 5.

It is noted that the housing 28, which is shown as being transparent in this example, may also be opaque or non-transparent.

Figure 33:
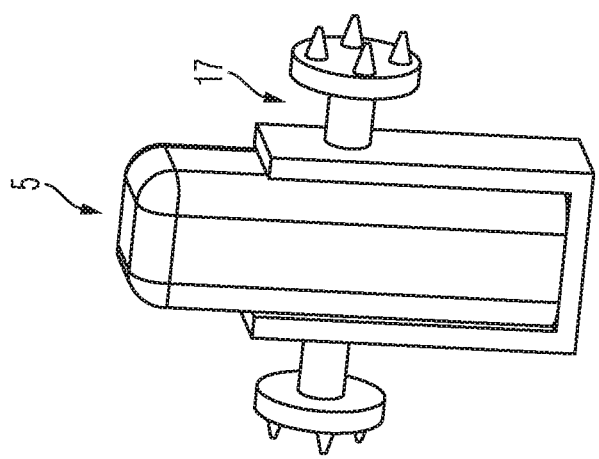
FIG. 33 shows a perspective assembly diagram of a vibration massage unit with insert element according to a further embodiment.

FIG. 33 shows a perspective assembly diagram of a vibration massage unit comprising an insert element according to a further embodiment.

In contrast to FIG. 32, the housing 28 shown in this example is opaque.

Furthermore, there is no connection cable 20 provided in this example. Connection cable 20 may, of course, still be attached to the power supply of drive 6 during installation.

It is also conceivable, however, to supply power to the drive 6 by one or more batteries accommodated in the housing 5. Charging of the batteries, for example, could be carried out by induction without cables if the vibration massage unit is not currently active.

Figure 34:
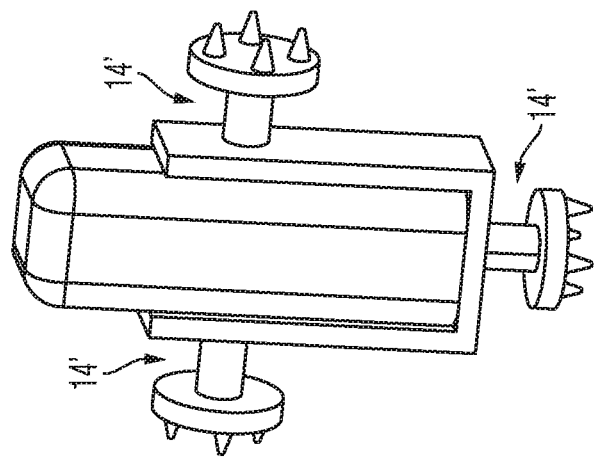
FIG. 34 shows a perspective assembly diagram of a vibration massage unit with an insert element according to a further embodiment.

FIG. 34 shows a perspective assembly diagram of a vibration massage unit 5 comprising an insert element 12 according to a further embodiment.

In this example, an additional projection 14' is provided at the lower end 19 of the vibration massage unit 5, which also has a mounting section 16.

The additional projection 14' is also equipped with a flexible portion so that vibration of the vibration massage unit 5 is still possible, in particular in the form of a wobbling movement.

Figure 35:
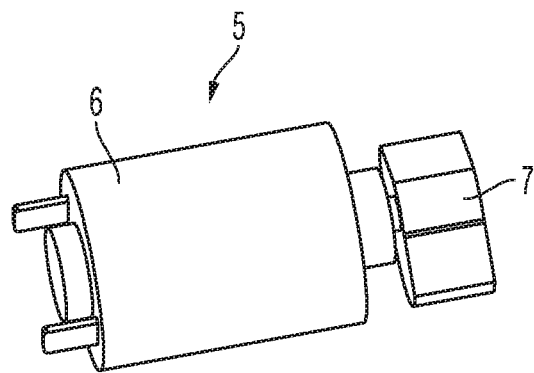
FIG. 35 shows a perspective view of the bottom of a vibration massage unit.
Figure 36:
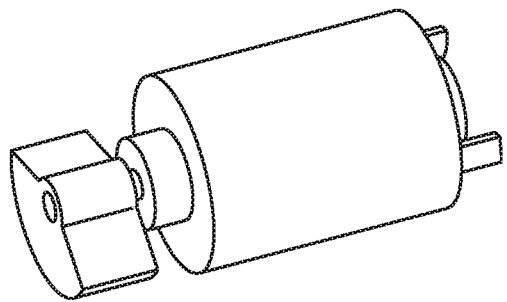
FIG. 36 shows a perspective view of the front side of the vibration massage unit according to FIG. 35.

FIG. 35 shows a perspective view of the bottom side of a vibration massage unit 5 on its own. FIG. 36 shows a perspective view of the front.

In this example, there is provided a drive 6 and an unbalance mass 7, without a housing.

Figure 37:
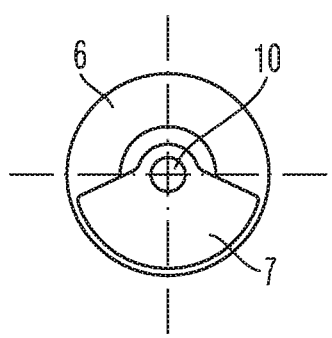
FIG. 37 shows a front view of the vibration massage unit according to FIGS. 35 and 36.

FIG. 37 shows a front view of the vibration massage unit according to FIGS. 35 and 36.

In particular, the shape of the unbalance mass, which is mounted on the shaft 10 and which is configured to be eccentric, may be seen. A large part of the mass is arranged on a circular segment which has an angle smaller than 180° to the shaft, and a radius smaller than the radius of the drive 6.

The vibration massage unit 5 may be integrated into a housing 28.

Figure 38:
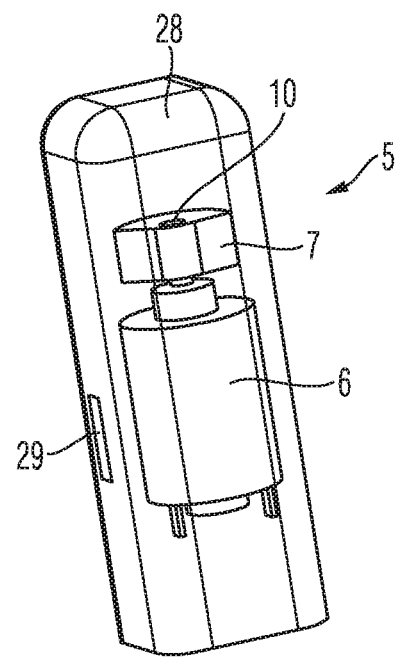
FIG. 38 shows a perspective view of the front side of a vibration massage unit inside a housing.

FIG. 38 shows a perspective view of the front of a vibration massage unit 5 comprising housing 28.

In this example, the housing 28 is configured as a cuboid with rounded corners. Alternatively, it may also be of circular-cylindrical shape, or may be of another cylindrical shape.

The housing 28 extends longitudinally parallel to the shaft 10 of the drive 6. In addition, counter locking means 29 are provided for mounting in an insert element 12.

Figure 39:
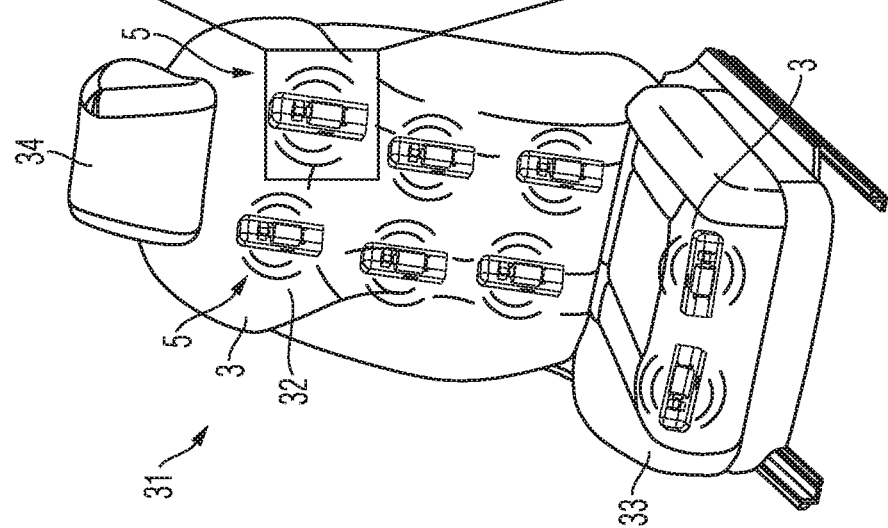
FIG. 39 shows a perspective view of a vehicle seat.

FIG. 39 shows a perspective view of a vehicle seat 31.

The vehicle seat 31 may include a backrest 32, a seat pan 33, and a seat neck support 34.

The vehicle seat 31 also may include a multitude of vibration massage units 5. These are distributed over the backrest 32 and the seat pan 33, and are each accommodated under a covering in a recess 4 as described with respect to FIG. 1. Covering 3 is shown here in a transparent manner for better clarity of the configuration.

For example, six vibration massage units are provided in the backrest 32, and two vibration massage units are provided in the seat pan 33. However, any number and/or arrangement of vibration massage units 5 may be possible.

The vibration massage unit 5 arranged in the backrest 32 is arranged upright i.e. vertically, while the vibration massage units 5 arranged in the seat pan 33 are arranged horizontally.

A shaft 10 of the drive 6 of each vibration massage unit 5 thus runs parallel to a covering 3 of the vehicle seat 31, with the covering 3 covering the elements of the vehicle seat formed by the backrest 32, seat pan 33, and seat neck support 34.

Figure 40:
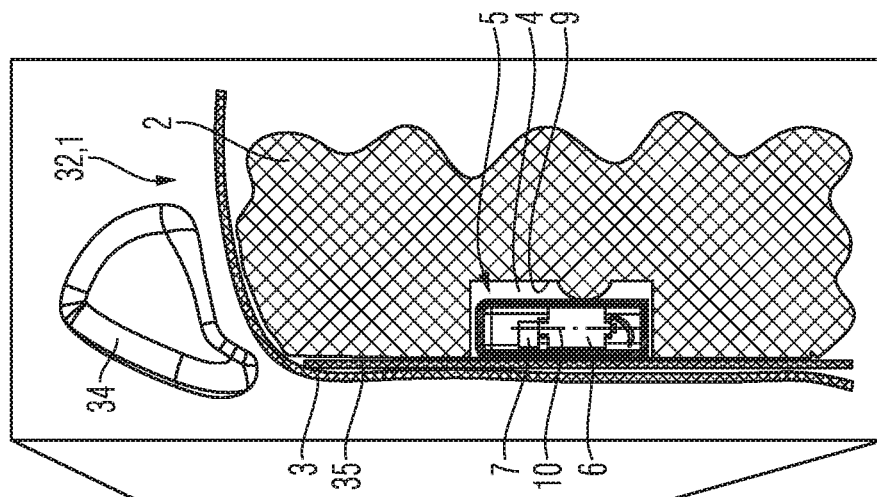
FIG. 40 shows an enlarged cross-section of a portion of the vehicle seat according to FIG. 39.

FIG. 40 shows an enlarged cross-section of a portion of the vehicle seat 31 according to FIG. 39.

The portion shown in this example is located in an upper part of the backrest 32, which forms a vehicle seat element 1.

A fleece 35 applied to the cushion 2 is provided underneath the covering 3. Directly below the fleece 35 the vibration massage unit 5 is arranged in a recess 4 of the cushion 2.

As described with respect to FIG. 1, the vibration massage unit is supported in the recess 4 at a point or in lines and spaced from the end 8 of the vibration massage unit 5 at which the unbalance mass 7 is arranged. The substantial portion of walls 9 of the recess 4 is spaced from the vibration massage unit 5.

Figure 41:
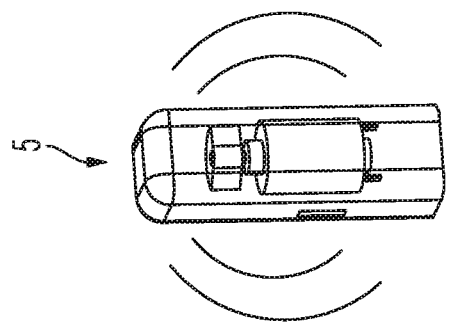
FIG. 41 shows a detailed perspective view of a vibration massage unit of a backrest of the vehicle seat according to FIG. 39.

FIG. 41 shows a detailed perspective view of a vibration massage unit 5 of a backrest 32 of the vehicle seat 31 according to FIG. 39.

Shown here is a representation in the upright installation position, as the vibration massage unit 5 is arranged in the backrest 32. With the lines around the vibration massage unit 5, the direction of vibration is indicated substantially radially to the shaft 10, which produces a massage effect by the covering 3 running parallel to the shaft 10 substantially vertically to an occupant of the vehicle seat 31.

Figure 42:
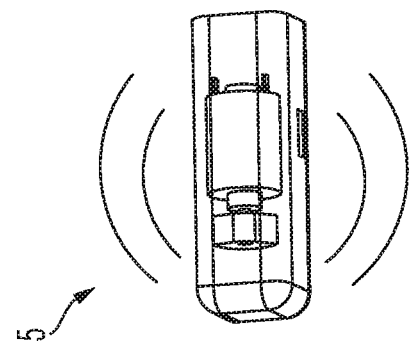
FIG. 42 shows a detailed perspective view of a vibration massage unit of a seat pan of the vehicle seat according to FIG. 39.

FIG. 42 shows a detailed perspective view of a vibration massage unit 5 of a seat pan 33 of the vehicle seat 31 according to FIG. 39.

This is a representation in the horizontal installation position, as the vibration massage unit 5 of the seat pan 33 is arranged. Due to the horizontal orientation, the direction of vibration is substantially vertical, i.e. also substantially radial to the shaft 10 of the drive 6 thereof, which runs parallel to the covering 3 of the seat pan.

Although the present invention has been fully described above using preferred exemplary embodiments, it is not limited hereto, but may be modified in many ways.

LIST OF REFERENCE SIGNS

1 Vehicle seat element
2 Cushion
3 Covering
4 Recess
5 Vibration massage unit
6 Drive
7 Unbalance mass
8 End
9 Wall
10 Shaft
11 Plane/level
12 Insert element
13 Accommodating portion
14 Projection
15 Flexible portion
16 Mounting section
17 Fastening means
18 Projection
19 Lower end
20 Connection cable
21 Direction of support
22 Movement path
23 Top area
24 Base area 25 Web
26 Latching/locking means
27 Inner surface
28 Housing
29 Counter latching means
30 Web
31 Vehicle seat
32 Backrest
33 Seat pan
34 Seat neck support

The invention claimed is:

1. A vehicle seat element, including a seat pan, backrest or seat neck support, the vehicle seat element comprising:
   a cushion configured to face a vehicle occupant;
   a covering; and
   a vibration massage unit arranged in a recess defined by the cushion and disposed underneath the covering and including,
      an electric drive and
         a driven unbalanced mass arranged at one end of the vibration massage unit,
      wherein the vibration massage unit is supported in the recess by means of a protrusion extending into the recess and integral with the cushion, wherein the protrusion is spaced from the one end of the vibration massage unit on which the unbalanced mass is arranged, and
      wherein a substantial portion of walls of the recess are spaced apart from the vibration massage unit.

2. The vehicle seat element of claim 1, wherein the electric drive includes a shaft, extending in a first direction, wherein the driven unbalanced mass is configured to rotate about the shaft, wherein the vibration massage unit has an elongated shape and extends in the first direction, and wherein the protrusion is positioned circumferential to the vibration massage unit and normal to the shaft.

3. The vehicle seat element of claim 2,
   wherein the protrusion is arranged in a plane arranged normal to the shaft.

4. The vehicle seat element of claim 2, wherein the shaft is disposed approximately parallel to the covering or wherein when the vibration massage unit is arranged in a vertical arrangement, the unbalanced mass is arranged at a top of the shaft, and wherein a second protrusion is provided in a portion of a lower end of the vibration massage unit.

5. The vehicle seat element of claim 4, wherein the protrusion and the second protrusion from a flexible support in the recess of the cushion such that the vibration massage unit is movable in the recess in a defined manner during operation.

6. The vehicle seat element of claim 1, wherein the protrusion is disposed approximately in the center of the recess.

7. The vehicle seat element of claim 1, wherein the recess is at least partially formed by a first wall and a second wall, opposing the first wall, wherein the protrusion extends from the first wall and a second protrusion extends from the second wall.

8. The vehicle seat element of claim 7, wherein the cushion is formed of a foam cushion, wherein the protrusion and the second protrusion are foam protrusions or foam webs integral with the cushion.

9. The vehicle seat of claim 1, wherein the protrusion has a convex shape with respect to the walls of the recess.

10. The vehicle seat of claim 1, wherein the protrusion has a T-shaped cross-section.

11. The vehicle seat of claim 10, wherein the T-shaped cross-section includes a first portion, extending in a direction normal to a shaft of the electric drive, and a second portion extending parallel to the shaft of the electric drive.

12. The vehicle seat of claim 1, wherein the vibration massage unit is supported by a second protrusion extending into the recess and integral with the cushion.

13. The vehicle seat of claim 12, wherein the second protrusion opposes the protrusion.

14. The vehicle seat of claim 12, wherein the vibration massage unit is supported by a third protrusion extending in a direction parallel to a shaft of the electric drive.

15. A method of producing a vehicle seat element, the method comprising:
   providing a vibration massage unit, comprising:
      an electric drive and a driven unbalanced mass, which is arranged at one end of the vibration massage unit,
      a cushion, which has a recess for accommodating the vibration massage unit, wherein the cushion includes a projection extending into the recess and integral with the cushion, and
      a covering;
   inserting the vibration massage unit into the recess so that the vibration massage unit engages and contacts the projection; and
   supporting, by the projection, a portion of the vibration massage unit, wherein the portion is spaced from the one end of the vibration massage unit, and second portions of the vibration massage unit are spaced apart from a substantial portion of walls of the recess; and
   covering the cushion with the covering, wherein the vibration massage unit is arranged underneath the covering.

16. A vehicle seat including a cushion, defining a recess, and a covering, the vehicle seat comprising:
   a vibration massage unit including an electric drive and an unbalanced mass arranged at one end of the vibration massage unit, the vibration massage unit is disposed beneath the covering in the recess defined by the cushion, wherein
   a first portion of the vibration massage unit is supported by a first projection extending from and integral with a first wall of a plurality of walls forming the recess and
   a second portion of the vibration massage unit is spaced apart from other portions of the plurality of walls.

17. The vehicle seat of claim 16, wherein the vibration massage unit includes a shaft and wherein the projection extends in a direction that is normal to the shaft.

18. The vehicle seat of claim 16, wherein the projection has a convex shape with respect to the first wall.

19. The vehicle seat of claim 16, wherein the projection has a T-shaped cross-section.

20. The vehicle seat of claim 19, wherein the T-shaped cross-section includes a first portion and a second portion including a pair of bulbous members extending from the first portion.

* * * * *

UNITED STATES PATENT AND TRADEMARK OFFICE
CERTIFICATE OF CORRECTION

PATENT NO. : 11,241,988 B2
APPLICATION NO. : 16/332560
DATED : February 8, 2022
INVENTOR(S) : Christian Mergl et al.

Page 1 of 1

It is certified that error appears in the above-identified patent and that said Letters Patent is hereby corrected as shown below:

In the Claims

Column 15, Line 47, Claim 5:
After "protrusion and the second protrusion"
Delete "from"
Insert --form--

Signed and Sealed this
Nineteenth Day of April, 2022

Katherine Kelly Vidal
*Director of the United States Patent and Trademark Office*